US012342285B2

(12) United States Patent
Lim et al.

(10) Patent No.: US 12,342,285 B2
(45) Date of Patent: Jun. 24, 2025

(54) ELECTRONIC DEVICE INCLUDING A POWER MANAGEMENT INTEGRATED CIRCUIT (PMIC) AND OPERATING METHOD THEREOF

(71) Applicant: SAMSUNG ELECTRONICS CO., LTD., Suwon-si (KR)

(72) Inventors: Yeongseob Lim, Suwon-si (KR); Sungyoul Cho, Suwon-si (KR); Hyeyong Go, Suwon-si (KR); Jungjoon Kim, Suwon-si (KR); Sanghyeok Yang, Suwon-si (KR); Kyujae Jang, Suwon-si (KR); Hyunkyung Jo, Suwon-si (KR); Hojong Kim, Suwon-si (KR); Jaeuk Ryu, Suwon-si (KR); Jihyeon Jang, Suwon-si (KR); Minkwon Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 449 days.

(21) Appl. No.: 17/854,857

(22) Filed: Jun. 30, 2022

(65) Prior Publication Data
US 2023/0007591 A1  Jan. 5, 2023

Related U.S. Application Data

(63) Continuation of application No. PCT/KR2022/009069, filed on Jun. 24, 2022.

(30) Foreign Application Priority Data

Jul. 2, 2021 (KR) .................. 10-2021-0087315

(51) Int. Cl.
*H04W 52/02* (2009.01)
*H04B 1/04* (2006.01)
(Continued)

(52) U.S. Cl.
CPC .......... *H04W 52/0261* (2013.01); *H04B 1/04* (2013.01); *H04W 72/0453* (2013.01); *H04B 2001/0408* (2013.01)

(58) Field of Classification Search
None
See application file for complete search history.

(56) References Cited

U.S. PATENT DOCUMENTS 9,293,986 B2  3/2016 Thandri et al.
9,720,472 B2  8/2017 Park et al.
(Continued)

FOREIGN PATENT DOCUMENTS

JP  2002304232 A  10/2002
KR  100576108 B1  5/2006
(Continued)

OTHER PUBLICATIONS

International Search Report and Written Opinion for International Application No. PCT/KR2022/009069; International Filing Date Jun. 24, 2022; Date of Mailing Oct. 17, 2022; 9 Pages.

*Primary Examiner* — Hong Shao
(74) *Attorney, Agent, or Firm* — CANTOR COLBURN LLP

(57) ABSTRACT

An electronic device may include a wireless communication circuit, a battery, a power management integrated circuit (PMIC) electrically connected to the wireless communication circuit and the battery and including a regulator, and a processor electrically connected to the wireless communication circuit, the battery, and the PMIC. The processor may, responsive to the electronic device satisfying a specified condition, identify a change in a magnitude of a voltage of an output terminal of the regulator for a first time interval, identify a ratio of a time interval during which the change in the magnitude of the voltage of the output terminal satisfies a threshold value with respect to the first time interval, and (Continued)

adjust the magnitude of the voltage of the output terminal in a step-wise manner based on the ratio.

19 Claims, 10 Drawing Sheets

(51) Int. Cl.
*H04W 72/04* (2023.01)
*H04W 72/0453* (2023.01)

(56) References Cited

U.S. PATENT DOCUMENTS

| | | | |
|---|---|---|---|
| 10,719,095 | B2 | 7/2020 | Jeong |
| 2019/0334512 | A1* | 10/2019 | Yu .............................. H03K 5/00 |
| 2020/0160794 | A1* | 5/2020 | Park ..................... G09G 3/3291 |

FOREIGN PATENT DOCUMENTS

| | | | |
|---|---|---|---|
| KR | 20090125674 | A | 12/2009 |
| KR | 101799333 | B1 | 11/2017 |
| KR | 20190142535 | A | 12/2019 |
| KR | 102215583 | B1 | 2/2021 |

\* cited by examiner

ELECTRONIC DEVICE INCLUDING A POWER MANAGEMENT INTEGRATED CIRCUIT (PMIC) AND OPERATING METHOD THEREOF

TECHNICAL FIELD

The disclosure relates to an electronic device including a power management integrated circuit (PMIC) and a method of operating the same.

BACKGROUND ART

A mobile terminal may support various communications (e.g., cellular communications such as long-term evolution (LTE) and/or new radio (NR)). For example, the mobile terminal may support a voice over LTE (VoLTE) call for transmitting and receiving voice data through an LTE network.

The mobile terminal may include a radio frequency front end (RFFE) module to support various communications. For example, the RFFE module may include a radio frequency (RF) component such as a power amplifier (PA) for amplifying a signal to be transmitted.

The mobile terminal may supply power to RFFE components (e.g., PA) using a power management integrated circuit (PMIC). For example, the PMIC may supply a driving voltage Vcc to the PA of the RFFE. The power amplifier may amplify and output an input signal based on the driving voltage Vcc.

DISCLOSURE

Technical Problem

A magnitude of the driving voltage used for the PA included in a transmission path of the RFFE may vary depending on the strength of a wireless signal transmitted by the mobile terminal. The PMIC may provide various output voltages to supply the driving voltage to the PA. For example, the output voltage output from the PMIC to the PA may be changed according to a condition (e.g., channel state or communication quality) of the electronic device. The output voltage of the PMIC may be changed based on average power tracking (APT) and/or envelope tracking (ET). As the output voltage supplied from the PMIC to the PA is changed, the amount of a charge in a capacitor electrically connected to the PMIC may vary. That is, charging and discharging of the capacitor may occur repeatedly. Due to the charging and discharging of the capacitor, a physical shaking of the capacitor may be caused. Also, noise due to shaking may occur.

When the noise caused in the capacitor belongs to an audible frequency band, a user of the electronic device may recognize the noise. For example, noise in the audible frequency band may be included in a received voice when a voice call is performed using an electronic device to deteriorate call quality.

Technical Solution

According to an embodiment disclosed herein, an electronic device includes a wireless communication circuit, a battery, a power management integrated circuit (PMIC) electrically connected to the wireless communication circuit and the battery and including a regulator, and a processor electrically connected to the wireless communication circuit, the battery, and the PMIC, wherein the processor may, responsive to the electronic device satisfying a specified condition, identify a change in a magnitude of a voltage of an output terminal of the regulator for a first time interval, identify a ratio of a time interval during which the change in the magnitude of the voltage of the output terminal satisfies a threshold value with respect to the first time interval, and adjust the magnitude of the voltage of the output terminal in a step-wise manner based on the ratio.

According to an embodiment disclosed herein, a method for operating an electronic device may include identifying a change in a magnitude of a voltage of an output terminal of a regulator included in a power management integrated circuit (PMIC) for a first time interval responsive to the electronic device satisfying a specified condition, identifying a ratio of a time interval during which the change in the magnitude of the voltage of the output terminal satisfies a threshold value with respect to the first time interval, and adjusting the magnitude of the voltage of the output terminal in a step-wise manner for a second time interval based on the ratio.

Advantageous Effects

According to the embodiments disclosed herein, the electronic device may adjust (e.g., boost or buck) the output voltage of the PMIC in a stepwise manner, thereby reducing the degradation of call quality due to noise.

In addition, various effects may be provided that are directly or indirectly understood through the disclosure.

It is to be noted that effects of various embodiments of the disclosure are not limited to the above-mentioned effects, and other effects not mentioned will be clearly understood by those of ordinary skill in the art to which the disclosure belongs from the description below.

DESCRIPTION OF DRAWINGS

In the description of the drawings, the same or similar reference numerals may be used for the same or similar components.

MODE FOR INVENTION

Figure 1:
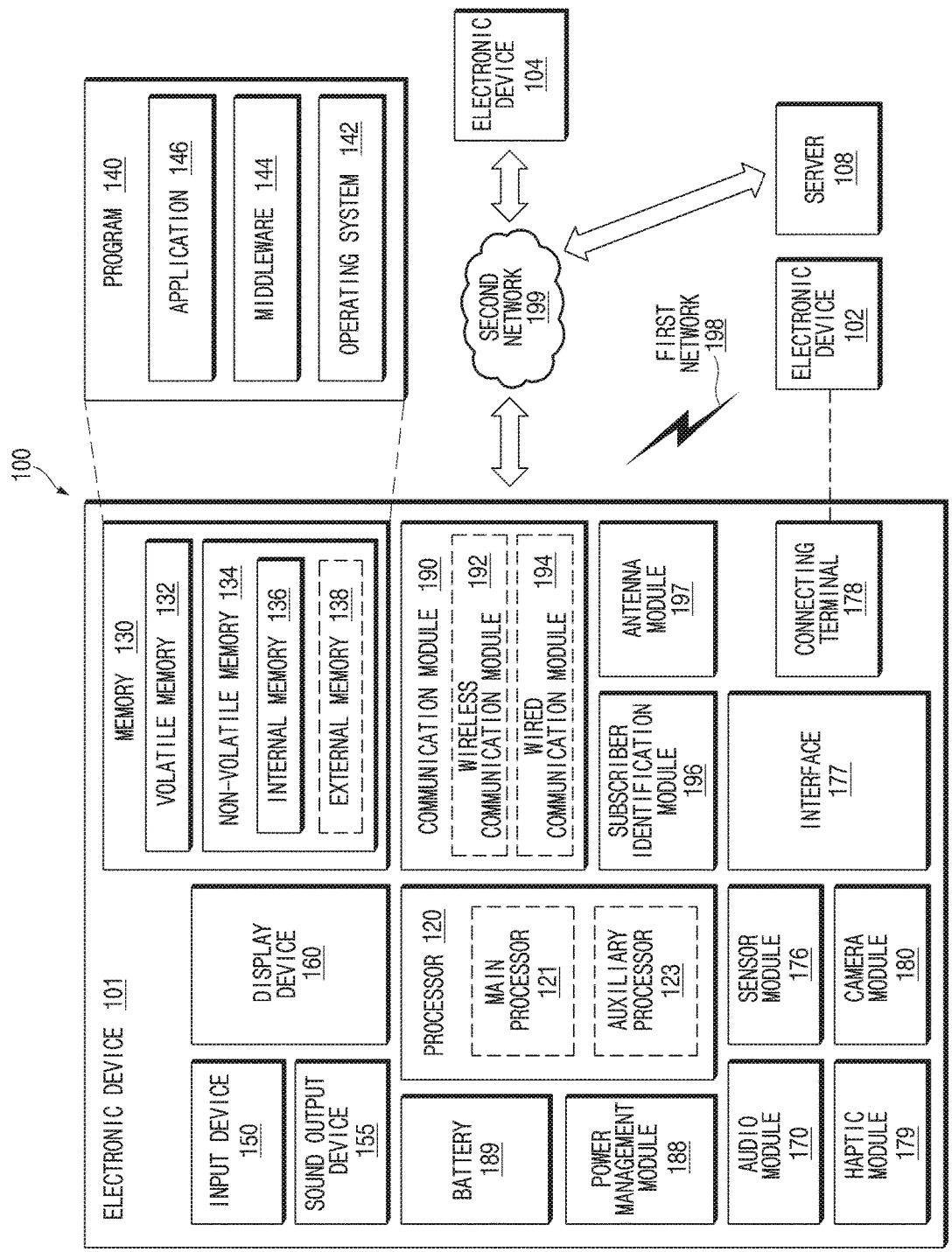
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
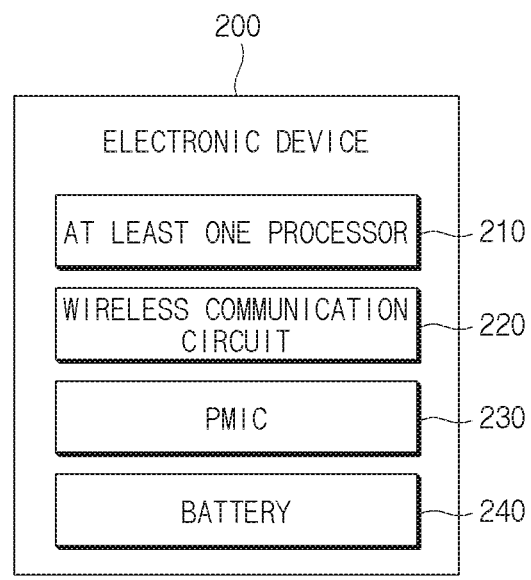
FIG. 2 is a block diagram illustrating a configuration of an electronic device according to an embodiment of the disclosure.
Figure 3:
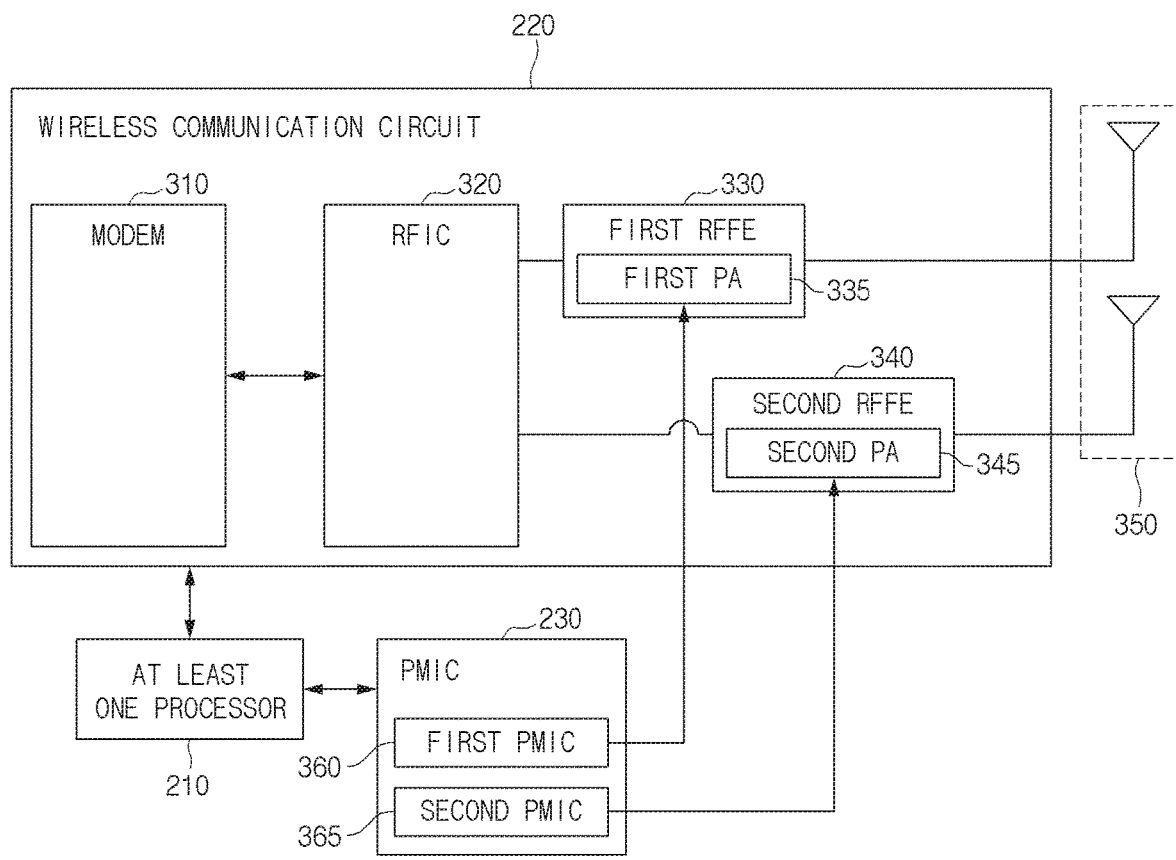
FIG. 3 illustrates an electronic device according to an embodiment of the disclosure.
Figure 4:
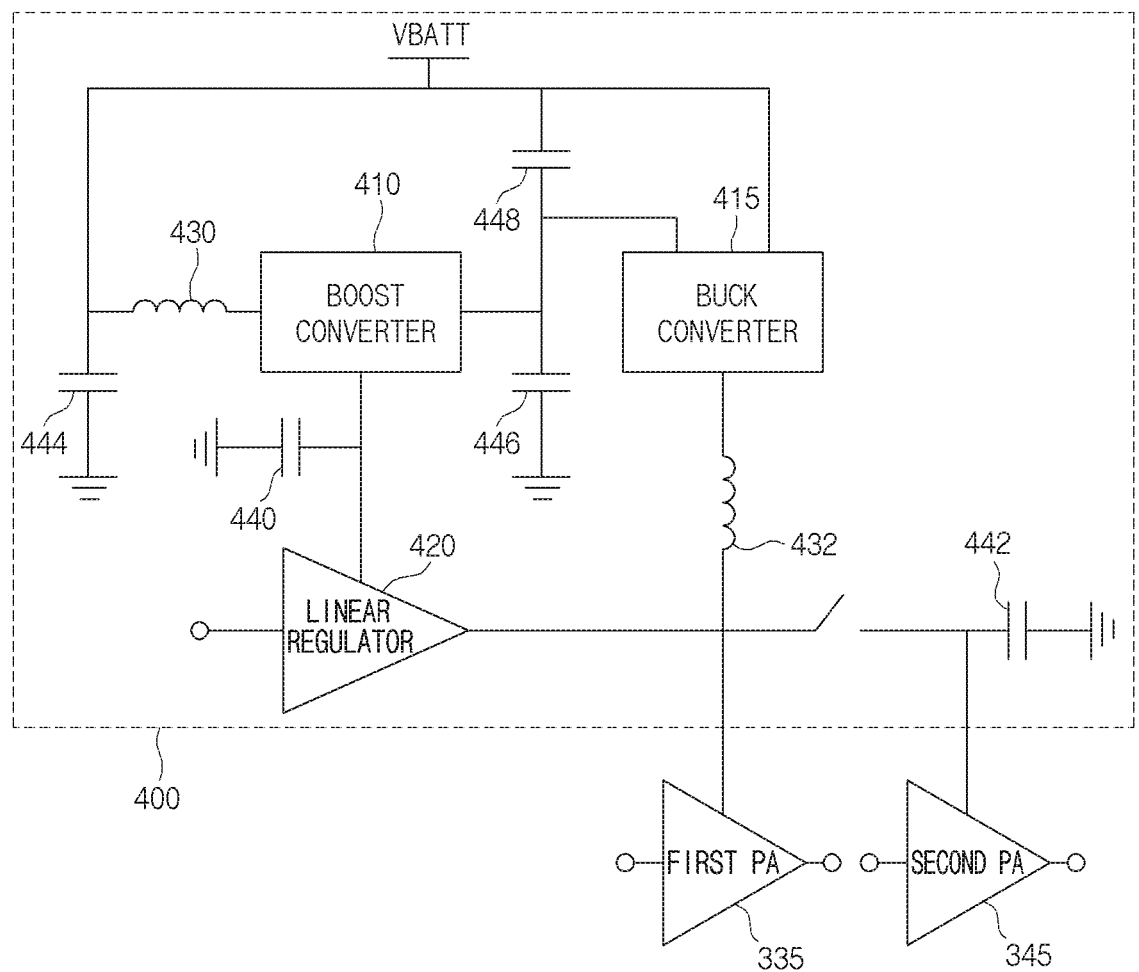
FIG. 4 illustrates a part of a PMIC configuration according to an embodiment of the disclosure.
Figure 5:
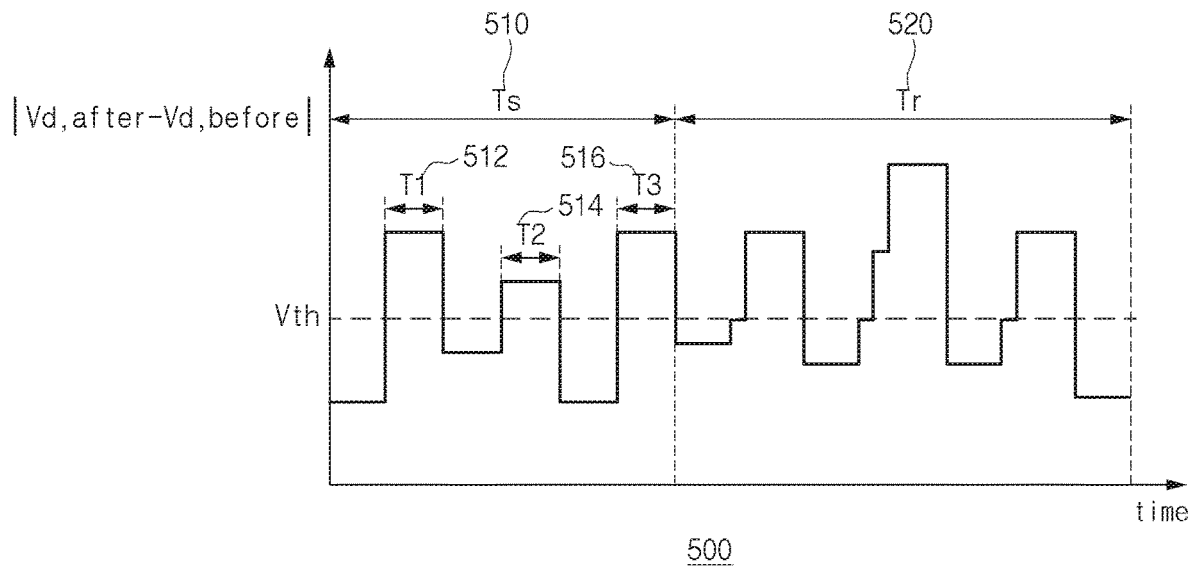
FIG. 5 is a graph illustrating a change in voltage magnitude of a voltage at an output terminal of a boost converter according to an embodiment of the disclosure.

FIG. 2 is a block diagram illustrating a configuration of an electronic device 200 according to an embodiment of the disclosure. FIG. 3 illustrates an electronic device according to an embodiment of the disclosure. FIG. 4 illustrates a part of a PMIC configuration according to an embodiment of the disclosure. FIG. 5 is a graph 500 illustrating a change in voltage magnitude of a voltage at an output terminal of a boost converter according to an embodiment of the disclosure.

Referring to FIG. 2, an electronic device 200 may include a processor 210, a wireless communication circuit 220, a power management integrated chip (PMIC) 230, and/or a battery 240.

According to an embodiment, the processor 210, the wireless communication circuit 220, the PMIC 230, and the battery 240 may correspond to the processor 120, the communication module 190, and the power management module 188, and the battery 189 of FIG. 1, respectively.

According to an embodiment, the processor 210 may include one or more processors. According to an embodiment, the processor 210 may include the main processor 121 (e.g., an application processor) of FIG. 1 and/or the auxiliary processor 123 (e.g., a communication processor) of FIG. 1. The communication processor may be implemented as a part of the main processor 121 or as a separate processor from the main processor 121. Alternatively, the processor 210 may be implemented as a part of the wireless communication circuit 220.

Although the processor 210 (e.g., CP) is illustrated in FIG. 3 as being implemented separately from the wireless communication circuit 220, the processor 210 may be implemented as a part of the wireless communication circuit 220.

According to an embodiment, the processor 210 may be electrically connected to the wireless communication circuit 220 and/or the PMIC 230. Hereinafter, it may be understood that the operations of the wireless communication circuit 220 and/or the PMIC 230 are substantially performed by the processor 210 according to an embodiment. For example, the processor 210 may be configured to control the wireless communication circuit 220 and/or the PMIC 230 by transmitting a control signal to the wireless communication circuit 220 and/or the PMIC 230.

According to an embodiment, the electronic device 200 may further include an antenna 350. The antenna 350 may be implemented as a part of the wireless communication circuit 220 or may be implemented separately from the wireless communication circuit 220. It may be understood from FIG. 3 that the antenna 350 is implemented separately from the wireless communication circuit 220 according to an embodiment.

According to an embodiment, the wireless communication circuit 220 may include a modem 310, a radio frequency integrated chip (RFIC) 320, a first radio frequency front end (RFFE) 330, and a second RFFE 340.

The modem 310 may support various wireless communications. For example, the modem 310 may support 4G long term evolution (LTE) communication and/or 5G new radio (NR) communication. For example, the modem 310 may support voice calls. The voice calls may include a packet-based voice call such as a VoLTE call and/or a voice over NR (VoNR). The voice calls may include circuit switching voice calls based on global system for mobile communications (GSM) and/or wideband code division multiple access (WCDMA).

The modem 310 may convert a digital signal into an analog signal and transmit the analog signal to the RFIC 320, or convert an analog signal into a digital signal and transmit the digital signal to the processor 210.

The RFIC 320 may up-convert a signal received from the modem 310 into a signal in a specified frequency band in the case of transmission. For example, the RFIC 320 may up-convert a baseband signal received from the modem 310 or an intermediate frequency band signal obtained through an intermediate frequency integrate circuit (IFIC) (not shown) into a signal in a specified frequency band. The RFIC 320 may transmit the up-converted signal to the first RFFE 330 and/or the second RFFE 340. The RFIC 320 may down-convert a signal obtained through the at least one antenna 350 into an intermediate frequency band signal or a baseband signal in the case of reception. The RFIC 320 may transmit the down-converted signal to the modem 310 via the IFIC or directly. According to an embodiment, the IFIC may be implemented as a part of the modem 310.

In the case of reception, the first RFFE 330 and the second RFFE 340 may pre-process a signal received through the antenna 350 and transmit the preprocessed signal to the RFIC 320. In the case of transmission, the first RFFE 330 and the second RFFE 340 may pre-process a signal transmitted from the RFIC 320 and transmit the preprocessed signal to the antenna 350. For example, the first RFFE 330 and the second RFFE 340 may amplify the magnitude of a received signal or filter a signal in a specific frequency band.

According to an embodiment, the first RFFE 330 may include a first power amplifier (PA) 335. The second RFFE 340 may include a second PA 345. The first PA 335 and the second PA 345 may be amplifiers included in a transmission path of the wireless communication circuit 220. The first PA 335 and/or the second PA 345 may individually amplify the intensity of an input signal based on the magnitude of the driving voltage Vcc and output the amplified signal. For example, the first PA 335 and/or the second PA 345 may amplify a signal to be transmitted by the electronic device 200. The magnitude of the driving voltage Vcc of each of the first PA 335 and the second PA 345 may be determined based on an output voltage of the PMIC 230.

According to an embodiment, the PMIC 230 may supply power to components of the electronic device 200 to operate the electronic device 200. For example, the PMIC 230 may supply power for the processor 210 to operate. The PMIC 230 may convert a voltage supplied from the battery 240 into various voltages to be used by the components. The PMIC 230 may protect and manage the components of the electronic device 200 by managing a state (e.g., voltage level) of the battery 240.

The PMIC 230 may include a first PMIC 360 and a second PMIC 365. The first PMIC 360 and the second PMIC 365 may be separated from each other physically and/or functionally. For example, the first PMIC 360 may be electrically connected to the first PA 335. The output voltage of the first PMIC 360 may be applied as a driving voltage of the first PA 335. The second PMIC 365 may be electrically connected to the second PA 345. The output voltage of the second PMIC 365 may be applied as a driving voltage of the second PA 345.

Referring to FIG. 4, a block 400 may correspond to at least a part of the configuration of the PMIC 230. The block 400 may functionally include the first PMIC 360 and/or the second PMIC 365. For example, an output terminal of the PMIC 230 may be electrically connected to the first PA 335 and/or the second PA 345. It may be understood that components related to driving of the first PA 335 functionally correspond to the first PMIC 360 of the PMIC 230, and components related to driving of the second PA 345 functionally correspond to the second PMIC 365 of the PMIC 230. The PMIC 230 may include a regulator 410, 415, or 420, and a circuit element (e.g., a plurality of inductors 430 and 432, and/or a plurality of capacitors 440, 442, 444, 446, and 448). The PMIC 230 may further include other components not shown in FIG. 4 (e.g., a capacitor, an inverter, a class AB amplifier).

Although the plurality of capacitors 440, 442, 444, 446, and 448 are illustrated in FIG. 4 as being included in the block 400, the plurality of capacitors 440, 442, 444, 446, and 448 may be implemented separately from the PMIC 230. For example, the plurality of capacitors 440, 442, 444, 446, and 448 may be implemented separately from the PMIC 230 on one circuit board (e.g., a printed circuit board (PCB)).

According to an embodiment, the regulator 410, 415, or 420 may efficiently convert a voltage to supply voltages of various magnitudes to the components of the electronic device 200. For example, the regulator 410, 415, or 420 may be a DC/DC converter that outputs an input direct current (DC) voltage as a stabilized DC voltage.

The regulator 410, 415, or 420 may include the boost converter 410, the buck converter 415, and/or the linear regulator 420.

The boost converter 410 and the buck converter 415 may be a type of switching regulator. The switching regulator may generate an output voltage at high speed by using turning on/off a switching element. The switching regulator may boost or buck an input voltage with high efficiency and low heat generation. For example, the boost converter 410 may boost and output the input voltage. For example, the buck converter 415 may buck and output the input voltage.

The linear regulator 420 may generate an output voltage using a variable resistor. The linear regulator 420 may buck and output the input voltage by a specified amount. The linear regulator 420 may maintain a stable and constant output voltage.

According to an embodiment, an output terminal of the regulator 410, 415, or 420 may be connected to one or more of the plurality of capacitors 440, 442, 444, 446, and 448 (e.g., the first capacitor 440 or the second capacitor 442). For example, an output terminal of the boost converter 410 may be connected to the first capacitor 440. For example, an output terminal of the buck converter 415 may be connected to the second capacitor 442.

According to an embodiment, the processor 210 may control the PMIC 230 to operate in various modes. For example, the PMIC 230 may operate in one of a sleep mode, a standby mode, an envelope tracking (ET) mode, or an average power tracking (APT) mode.

The PMIC 230 may operate in the sleep mode in response to the entry of the electronic device 200 into the sleep mode. For example, the sleep mode of the electronic device 200 may be a mode in which a communication related function is stopped to save battery and operates in a low power state. The PMIC 230 may cut off supply of power to internal components of the PMIC 230 in the sleep mode. Accordingly, the outputs of the PMIC 230 may be maintained in a tri-state. For example, the output of the PMIC 230 may have a high-impedance (Hi-impedance or Hi-Z) state in addition to "0" and "1" in the tri-state.

The PMIC 230 may cut off the supply of power to remaining internal components except for some components (or modules) of the PMIC 230 in the standby mode according to an embodiment. Some components (or modules) of the PMIC 230 may be enabled in the standby mode. An available component (or module) in the standby mode may be in charge of an auxiliary function of the PMIC 230. For example, the auxiliary function may include a temperature alarm function of the electronic device 200.

The PMIC 230 may receive an envelope signal from the modem 310 when transmitting a wireless signal in the ET mode. For example, the modem 310 may acquire the envelope signal based on peak values of a transmission signal. The PMIC 230 may adjust a driving voltage to be supplied to a PA based on the received envelope signal.

When transmitting a wireless signal in the APT mode, the PMIC 230 may determine average power based on an average of peak values of the transmission signal. The PMIC 230 may adjust the driving voltage to be supplied to the PA based on the average power.

According to an embodiment, the PMIC 230 may adjust a driving voltage of the first PA 335 when operating in the ET mode. When the PMIC 230 operates in the APT mode, the PMIC 230 may adjust a driving voltage of the second PA 345. The PMIC 230 may adaptively adjust the driving voltage of the PA (e.g., the first PA 335 or the second PA 345) in the ET mode or the APT mode to control a strength of the wireless signal to be transmitted with low power and high efficiency.

Referring back to FIG. 3, the processor 210 may perform a voice call using the wireless communication circuit 220. For example, the voice call may include a packet-based voice call such as a VoLTE call and/or a voice over NR (VoNR). As another example, the voice calls may include circuit switching voice calls based on global system for mobile communications (GSM) and/or wideband code division multiple access (WCDMA).

Hereinafter, for convenience of description, it is assumed that the voice call performed by the electronic device 200 is a VoLTE call, but the embodiments described herein are not so limited. For example, during a VoLTE call, the processor 210 may convert voice into data packets through the LTE network and transmit/receive to/from an external electronic device (e.g., the electronic device 104 of FIG. 1).

During the VoLTE call, the PMIC 230 may operate in the ET mode or the APT mode. The output voltage of the PMIC 230 (e.g., the first PMIC 360 and the second PMIC 365) in the ET mode or the APT mode may vary (change) depending on a condition of the electronic device 200 (e.g., a channel condition or a communication quality). The output voltage of the PMIC 230 may be applied as the driving voltage Vcc of a PA (e.g., the first PA 335 or the second PA 345) included in the wireless communication circuit 220.

A voltage of an output terminal (hereinafter, referred to as an output terminal) of the regulator 410, 415, or 420 may be linked to a change in the output voltage of the PMIC 230. For example, the magnitude of the voltage of the output terminal may increase as the output voltage of the PMIC 230 increases, or may decrease as the output voltage of the PMIC 230 decreases.

A capacitor (e.g., the first capacitor 440 and/or the second capacitor 442) connected to the output terminal may be charged or discharged according to a change in the magnitude of the voltage of the output terminal. According to an embodiment, charging or discharging of the capacitor connected to the output terminal may cause a physical shaking of the capacitor. Due to the shaking, noise in an audible frequency band may be caused.

According to an embodiment, the noise caused in the capacitor may be included in a received voice of the VoLTE call being performed by the electronic device 200. In this case, a quality of the VoLTE call may be deteriorated.

Hereinafter, there will be described an operation of the processor 210 for reducing noise caused in the capacitor connected to the output terminal (e.g., the first capacitor 440 and/or the second capacitor 442) to prevent quality deterioration of the VoLTE call.

According to an embodiment, the processor 210 may determine whether the electronic device 200 satisfies a specified condition.

According to an embodiment, the specified condition may be a situation in which the quality of the VoLTE call performed by the electronic device 200 is likely to be deteriorated. The description of the specified condition is exemplary, and the specified condition may mean any situation in which the quality of a VoLTE call performed by the electronic device 200 may be deteriorated. For example, the processor 210 may determine whether a frequency band of the VoLTE call performed by the electronic device 200 is a specified frequency band (e.g., 800 MHz). The specified frequency band may be a frequency band in which audible noise of the capacitor may occur during a VoLTE call in a corresponding frequency band. The specified frequency band may be determined experimentally. For example, when a receiver is activated while the electronic device 200 is performing a VoLTE call in a specified frequency band, the processor 210 may identify that the electronic device 200 satisfies the specified condition. The receiver may be implemented as a speaker (e.g., the sound output module 155 of FIG. 1). In this case, noise caused by the capacitor may be transferred to a user through the receiver, and thus the quality of the VoLTE call may be deteriorated. For example, when a proximity sensor of the electronic device 200 detects an external object (e.g., the user's body) while the electronic device 200 is performing a VoLTE call in a specified frequency band, the processor 210 may identify that the electronic device 200 satisfies a specified condition. In this case, noise caused by the capacitor may be transferred to a user close to the electronic device 200, and thus the quality of the VoLTE call may be deteriorated.

According to another embodiment, it may be understood that the quality of the VoLTE call is not deteriorated when the electronic device 200 is separated from an external object (e.g., a part of the user's body (ear)) by a predetermined distance or more and the user cannot hear noise caused by the capacitor. In this case, the processor 210 may identify that the electronic device 200 does not satisfy the specified condition.

According to an embodiment, when the electronic device 200 satisfies the specified condition, the processor 210 may monitor a voltage of an output terminal for a specified time interval. For convenience of description, it is assumed that the output terminal is the output terminal of the boost converter 410.

According to an embodiment, the processor 210 may identify a magnitude of a current voltage of the output terminal. The processor 210 may identify a change in the magnitude of the voltage of the output terminal based on the magnitude of the current voltage of the output terminal.

According to an embodiment, the change in the magnitude of the voltage of the output terminal may be a difference between the magnitude of the current voltage of the output terminal and a reference value. According to an embodiment, the reference value may be the magnitude of the voltage of the output terminal immediately before the electronic device 200 enters the sleep mode.

According to an embodiment, when terminating a VoLTE call, the electronic device 200 may enter a sleep mode from a traffic mode. It may be understood that the traffic mode is an operation state in which the electronic device 200 performs a VoLTE call, and the sleep mode is a low power state in which the electronic device 200 does not perform a VoLTE call. The electronic device 200 in the sleep mode may enter the traffic mode from the sleep mode to perform a VoLTE call again. The processor 210 may identify, as the reference value, a magnitude of a voltage of the output terminal immediately before the electronic device 200 terminates the VoLTE call and enters the sleep mode, and identify, as the magnitude of the current voltage of the output terminal, the magnitude of the voltage of the output terminal after the electronic device enters the traffic mode to perform the VoLTE call.

The processor 210 may compare a change in the magnitude of the voltage of the output terminal with a threshold value. The processor 210 may identify a ratio of a time interval during which the change in the magnitude of the voltage of the output terminal satisfies (e.g., is equal to, is equal to or greater than, is greater than) the threshold value with respect to the specified time interval, based on a result of the comparison.

Referring to FIG. 5, a graph 500 illustrating a change in voltage magnitude of a voltage at an output terminal of a boost converter is shown. For the graph 500, a horizontal axis may indicate time and a vertical axis may indicate a change in the magnitude of the voltage of the output terminal. Here, the change in the magnitude of the voltage of the output terminal may be a difference between the magnitude (Vd, after) of the current voltage of the output terminal and the reference value (Vd, before).

The specified time interval may be referred to as Ts 510. A time interval which has elapsed after the specified time interval may be referred to as Tr 520.

According to an embodiment, the time interval during which the change in the magnitude of the voltage of the output terminal of the boost converter 410 satisfies a threshold value Vth (e.g., is equal to the threshold value Vth, is equal to or greater than the threshold value Vth, is greater than the threshold value Vth) may be T1 512, T2 514, and T3 516. The processor 210 may identify a ratio of the sum of T1 512, T2 514, and T3 516 with respect to Ts 510.

According to an embodiment, responsive to the ratio of the sum of T1 512, T2 514, and T3 516 with respect to Ts 510 satisfying (e.g., being greater than or equal to) a specified ratio (e.g., 50%), the processor 210 may adjust (e.g., boost or buck) the voltage of the output terminal for Tr 520 in a step-wise manner. According to an embodiment, boosting or bucking of the voltage of the output terminal in a step-wise manner may be substantially performed by boosting or bucking an output voltage of the PMIC 230 in a step-wise manner.

According to an embodiment, the processor 210 may boost or buck the voltage of the output terminal in the step-wise manner, thereby reducing a level of noise caused due to the shaking of the capacitor.

According to an embodiment, the electronic device 200 includes the wireless communication circuit 220, the battery 240, the power management integrated circuit (PMIC) 230 electrically connected to the wireless communication circuit 220 and the battery 240 and including a regulator 410, 415, or 420, and the processor 210 electrically connected to the wireless communication circuit 220, the battery 240, and the PMIC 230. The processor 210 may, responsive to the electronic device 200 satisfying a specified condition, identify a change in a magnitude of a voltage of an output terminal of the regulator 410, 415, or 420 for a first time interval. The processor 210 may identify a ratio of a time interval during which the change in the magnitude of the voltage of the output terminal satisfies a threshold value with respect to the first time interval. The processor 210 may adjust the magnitude of the voltage of the output terminal in a step-wise manner based on the ratio.

According to an embodiment, the processor 210 may be configured to identify that the electronic device 200 satisfies a specified condition based on the electronic device 200 performing a voice call in a specified frequency band.

According to an embodiment, the electronic device 200 may further include a receiver, and the processor 210 may be configured to identify that the electronic device 200 satisfies the specified condition based on the receiver being activated responsive to the electronic device 200 performing the voice call in the specified frequency band. According to an embodiment, the electronic device 200 further includes a proximity sensor, and the processor 210 is configured to identify that the electronic device satisfies the specified condition based on the proximity sensor detecting an external object responsive to the electronic device performing the voice call in the specified frequency band.

According to an embodiment, the voice call may include a voice call based on at least one of voice over LTE (VoLTE), voice over NR (VoNR), global system for mobile communications (GSM), or wideband code division multiple access (WCDMA).

According to an embodiment, the regulator may include a boost converter and/or a buck converter.

According to an embodiment, the wireless communication circuit 220 may include a power amplifier (PA) 335 and/or 345, and the PMIC 230 may be electrically connected to the PA 335 and/or 345.

According to an embodiment, the processor 210 may be configured to acquire a magnitude of average power of an envelope signal or a wireless signal based on a peak value of an output of the PA 335 and/or 345 when transmitting the wireless signal. The PA 335 and/or 345 may be included in the transmission path of the wireless communication circuit 220.

According to an embodiment, the electronic device 200 may further include a capacitor 440 and/or 442 electrically connected to the output terminal, and the processor 210 may be configured to charge or discharge the capacitor 440 and/or 442 in a stepwise manner by boosting or bucking the magnitude of the voltage of the output terminal responsive to the ratio satisfying a specified ratio.

Figure 6A:
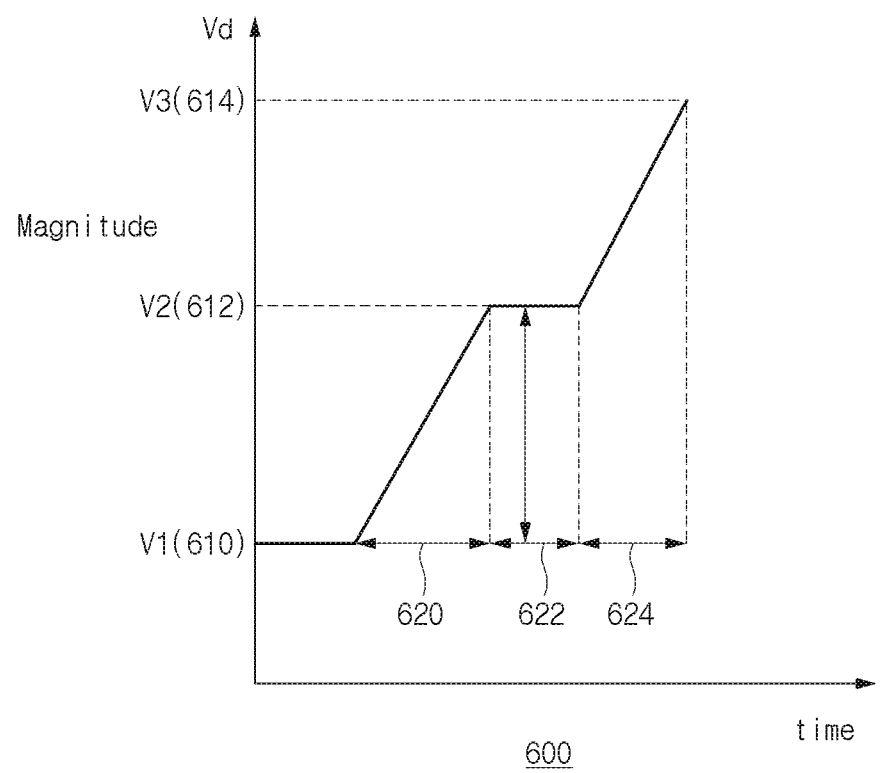
FIG. 6A is a graph illustrating stepwise boosting of voltage according to an embodiment of the disclosure.
Figure 6B:
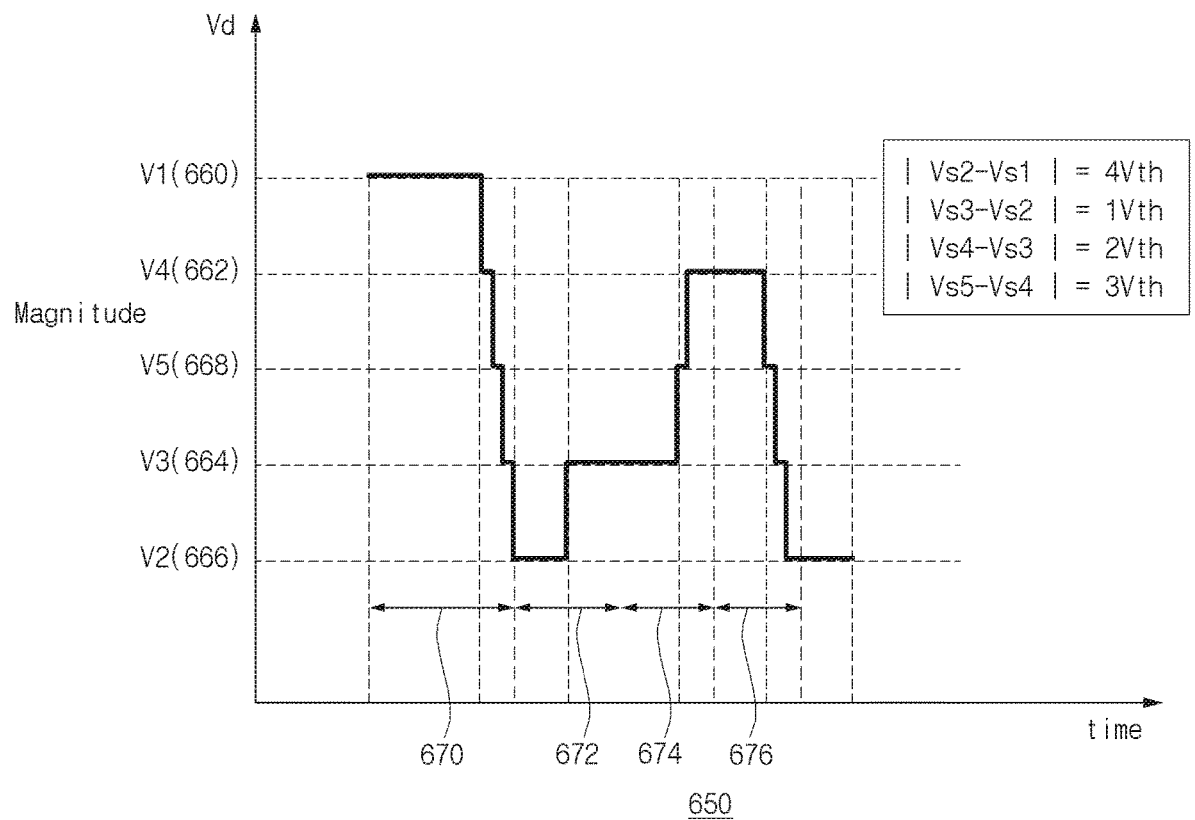
FIG. 6B is a graph showing stepwise boosting or bucking of a voltage based on the amount of stepwise boosting or bucking of the voltage of an output terminal, according to an embodiment of the disclosure.

FIG. 6A is a graph 600 illustrating stepwise boosting of voltage according to an embodiment of the disclosure. FIG. 6B is a graph 650 showing stepwise boosting or bucking of a voltage based on the amount of stepwise boosting or bucking of a voltage of an output terminal, according to an embodiment of the disclosure. For description of FIGS. 6A to 6B, reference may be made to the configurations of FIGS. 2 to 5.

Referring to FIG. 6A, a graph 600 illustrates a voltage at an output terminal of the boost converter 410 (hereinafter referred to as an output voltage) during a time interval (e.g., Tr 520) after Ts 510. The horizontal axis of the graph 600 may indicate time, and the vertical axis may indicate the magnitude (Vd) of the voltage of the output terminal.

According to an embodiment, the processor 210 may boost the voltage of the output terminal from V1 610 to V3 614. For example, it may be understood that V1 610 is a current voltage of the output terminal, and V3 614 may be a target voltage of the output terminal. The target voltage of the output terminal may be identified based on the operation of the PMIC 230 in the ET mode or APT mode.

According to an embodiment, the processor 210 may have one warm stage when the voltage of the output terminal is boosted from V1 610 to V3 614. In the warm stage, the voltage of the output terminal may be V2 612. For example, the processor 210 may boost the voltage of the output terminal from V1 610 to V2 612 for a first time interval 620. After a predetermined time interval 622 has elapsed, the processor 210 may boost the voltage of the output terminal from V2 612 to V3 614 for a second time interval 624.

Referring to FIG. 6B, a graph 650 shows the voltage of the output terminal for a time interval (e.g., Tr 520) after Ts 510. The horizontal axis of the graph 650 may indicate time, and the vertical axis may indicate the magnitude (Vd) of the voltage of the output terminal.

According to an embodiment, the processor 210 may identify a difference between a current output voltage and a target voltage of the output terminal when boosting or bucking the voltage of the output terminal. The target voltage of the output terminal may be identified based on the ET mode or the APT mode of the PMIC 230. According to an embodiment, the processor 210 may determine the number of warm stages based on the difference between the current output voltage and the target voltage of the output terminal. For example, when the difference between the current output voltage and the target voltage of the output terminal is greater than or equal to "n" times a threshold value Vth (n is a natural number) and less than "n+1" times the threshold value, the processor 210 may have up to n−1 warm stages when boosting or bucking the voltage of the output terminal.

According to an embodiment, the processor 210 may buck the voltage of the output terminal from V1 660 to V2 666 for a first time interval 670. The processor 210 may have at least one warm stage based on a difference between V1 660 and V2 666 when bucking the voltage of the output terminal from V1 660 to V2 666. For example, the difference between V1 660 and V2 666 may be four times the threshold value. In this case, the processor 210 may buck the voltage of the output terminal from V1 660 to V2 666 through three warm stages. In the warm stages, voltages of the output terminal may be V4 662, V5 668, and V3 664, respectively.

According to an embodiment, the processor 210 may boost the voltage of the output terminal from V2 666 to V3 664 for a second time interval 672. For example, a difference between V2 666 and V3 664 may be less than or equal to the threshold value Vth. In this case, the processor 210 may immediately boost the voltage of the output terminal from V2 666 to V3 664 without use of a warm stage.

According to an embodiment, the processor 210 may boost the magnitude of the voltage of the output terminal from V3 664 to V4 662 for a third time interval 674. For example, a difference between V3 664 and V4 662 may be twice the threshold value Vth. In this case, the processor 210 may boost the voltage of the output terminal from V3 664 to V4 662 through one warm stage. The magnitude of the voltage of the output terminal in the warm stage may be V3 664.

According to an embodiment, the processor 210 may buck the voltage of the output terminal from V4 662 to V2 666 for a fourth time interval 676. For example, a difference between V4 662 and V2 666 may be three times the threshold value Vth. In this case, the processor 210 may buck the voltage of the output terminal from V4 662 to V2 666 through two warm stages. In the warm stages, voltages of the output terminals may be V5 668 and V3 664, respectively.

Figure 7:
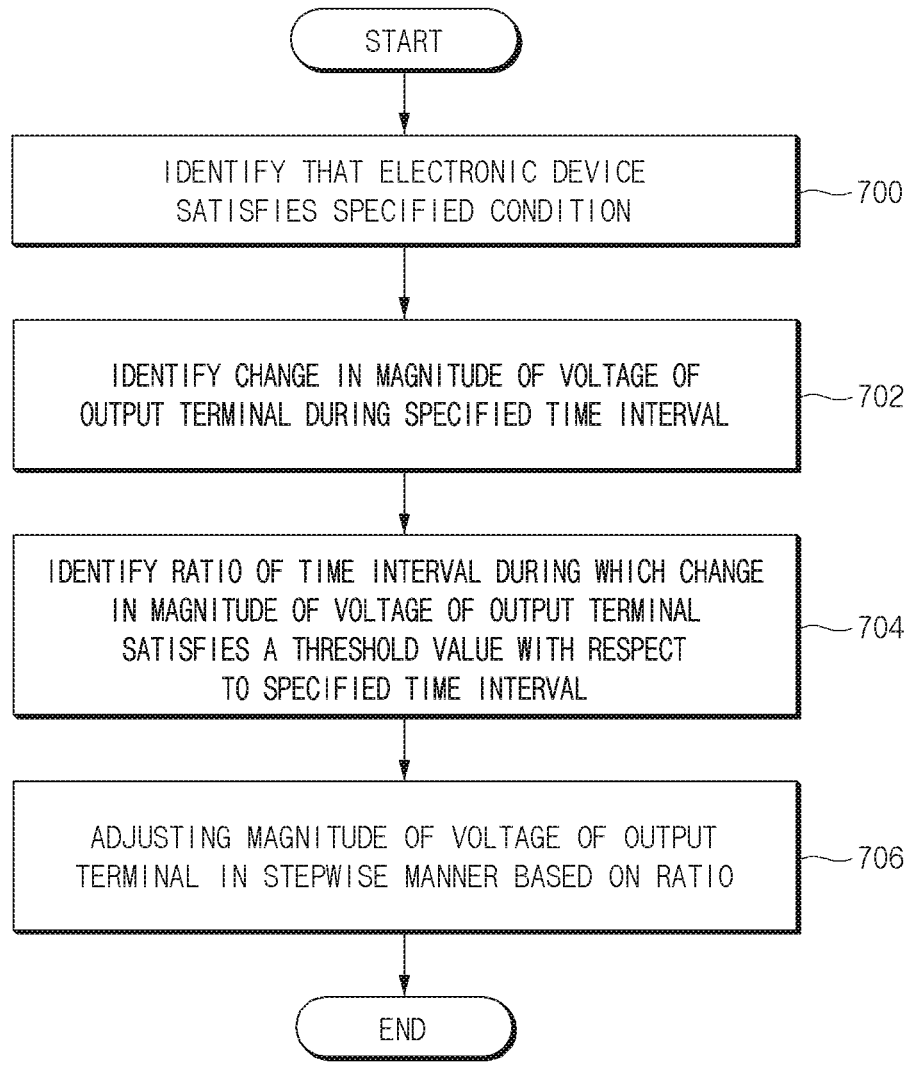
FIG. 7 is a flowchart for describing an operation of an electronic device according to an embodiment of the disclosure.

FIG. 7 is a flowchart for describing an operation of an electronic device according to an embodiment of the disclosure. For description with reference to FIG. 7, reference may be made to the descriptions of the configurations of FIGS. 2 to 5.

In operation 700, the processor 210 may identify whether the electronic device 200 satisfies a specified condition. The specified condition may be a situation in which the quality of a voice call is highly likely to be deteriorated. For example, the voice call may include a packet-based voice call such as a VoLTE call and/or a voice over NR (VoNR). As another example, the voice calls may include circuit switching voice calls based on global system for mobile communications (GSM) and/or wideband code division multiple access (WCDMA).

In operation 702, the processor 210 may identify a change in the magnitude of a voltage of an output terminal of a regulator (e.g., the boost converter 410, the buck converter 415) (hereinafter, the output terminal) for a specified time interval. For example, the change in the magnitude of the voltage of the output terminal may be a difference between the magnitude of the current voltage of the output terminal and a reference value.

In operation 704, the processor 210 may identify a ratio of a time interval during which the change in the magnitude of the voltage of the output terminal satisfies (e.g., is equal to, is equal to or greater than, is greater than) the threshold value with respect to the specified time interval.

In operation 706, the processor 210 may adjust (e.g., boost or buck) the magnitude of the voltage of the output terminal in a stepwise manner, based on the identified ratio. According to an embodiment, boosting or bucking of the voltage of the output terminal may be substantially performed by boosting or bucking an output voltage of the PMIC 230 in a stepwise manner.

According to an embodiment, when the ratio of a time interval during which a change in the magnitude of the voltage of the output terminal is equal to or greater than the threshold value with respect to a specified time interval is 50% or more, the processor 210 may boost or buck the voltage of the output terminal in a stepwise manner, for a time interval after the specified time interval. For example, the processor 210 may have at least one warm stage according to the boosting or bucking amount of the voltage of the output terminal when boosting or bucking the voltage of the output terminal. For another example, the processor 210 may not have a warm stage according to the boosting or bucking amount of the voltage of the output terminal.

According to an embodiment, when the ratio of a time interval during which a change in the magnitude of the voltage of the output terminal is less than the threshold value with respect to a specified time interval is less than 50%, the processor 210 may boost or buck the voltage of the output terminal for a time interval after the specified time interval. For example, when boosting or bucking the voltage of the output terminal, the processor 210 may boost or buck the voltage of the output terminal without use of a warm stage.

The description for boosting or bucking of the voltage of the output terminal may be referred to with reference to FIGS. 6A to 6B.

Figure 8A:
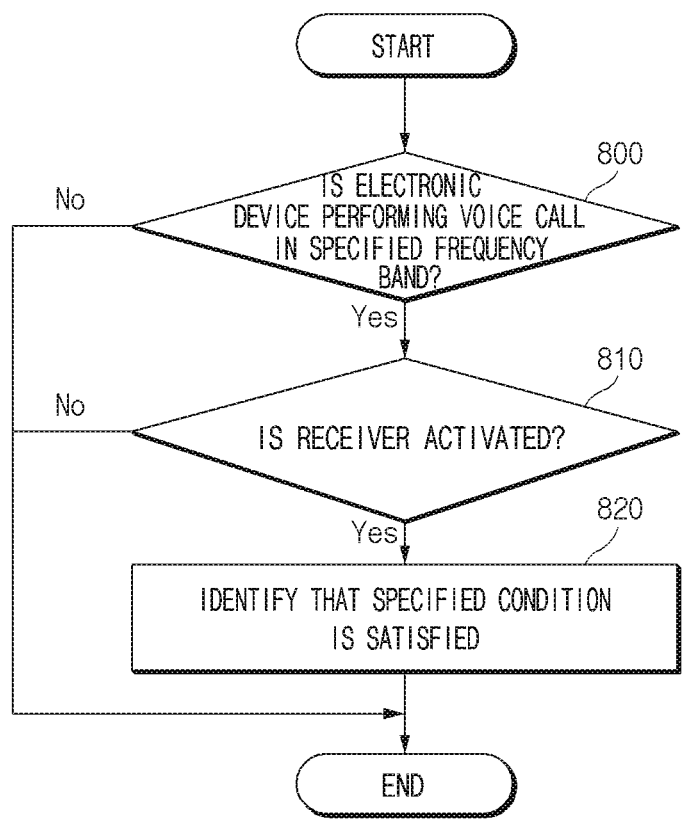
FIG. 8A is a flowchart for describing a specified condition according to an embodiment of the disclosure.
Figure 8B:
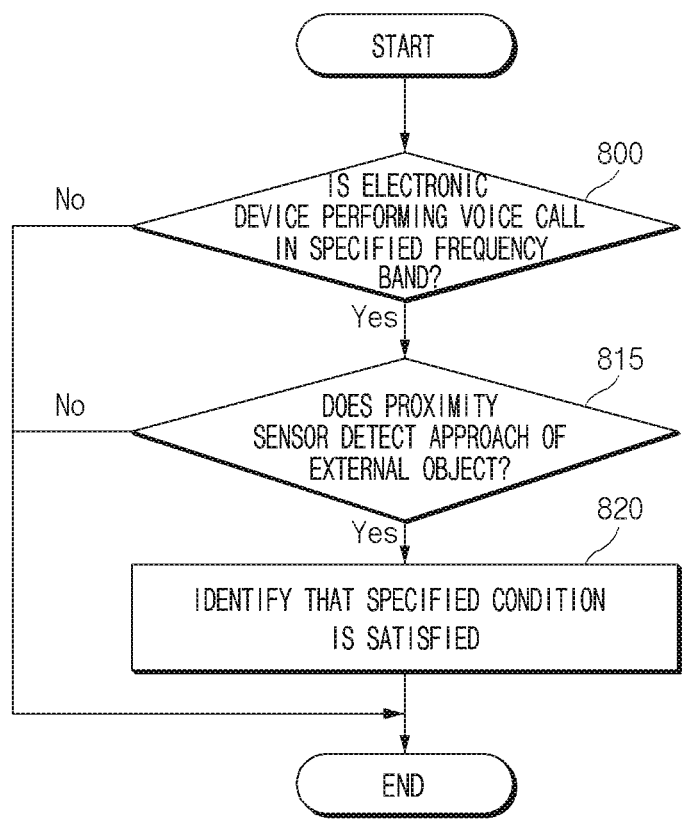
FIG. 8B is a flowchart for describing a specified condition according to an embodiment of the disclosure.

FIG. 8A is a flowchart for describing a specified condition according to an embodiment of the disclosure. FIG. 8B is a flowchart for describing a specified condition according to an embodiment of the disclosure. For the description with reference to FIGS. 8A to 8B, reference may be made to the description of the configurations of FIGS. 2 to 5.

Referring to FIG. 8B, in operation 800, the processor 210 may determine whether the electronic device 200 is performing a voice call (e.g., VoLTE call) in a specified frequency band (e.g., 800 MHz). For example, the specified frequency band may be a frequency band in which audible noise of a capacitor may occur during a VoLTE call in the corresponding frequency band. The specified frequency band may be determined experimentally.

When the electronic device 200 is not performing a voice call in a specified frequency band (800—NO), the processor 210 may end operation.

When the electronic device 200 is performing a voice call in a specified frequency band (800—YES), the processor 210 may proceed to operation 810. In operation 810, the processor 210 may determine whether a receiver is activated. For example, when the receiver is activated during the VoLTE call in the specified frequency band, noise may be transferred to a user through the receiver and thus the quality of the VoLTE call may be deteriorated.

When the receiver is not activated (810—NO), the processor 210 may end operation.

When the receiver is activated (810—YES), the processor 210 may proceed to operation 820. In operation 820, the processor 210 may identify that the electronic device 200 satisfies a specified condition, and proceed to operation 710 of FIG. 7.

Referring to FIG. 8B, unlike FIG. 8A, in operation 815, the processor 210 may determine whether a proximity sensor has detected the approach of an external object (e.g., the user's body). For example, when the proximity sensor detects the approach of the external object during the VoLTE call in the specified frequency band, noise may be transferred to a user close to the electronic device 200 and thus the quality of the VoLTE call may be deteriorated.

The invention claimed is:

1. An electronic device comprising:
   a wireless communication circuit;
   a battery;
   a power management integrated circuit (PMIC) electrically connected to the wireless communication circuit and the battery and including a regulator;
   a capacitor electrically connected to an output terminal of the regulator; and
   a processor electrically connected to the wireless communication circuit, the battery, and the PMIC,
   wherein the processor is configured to, responsive to the electronic device satisfying a specified condition,
   identify a change in a magnitude of a voltage of the output terminal of the regulator for a first time interval,
   identify a ratio of a third time interval during which the change in the magnitude of the voltage of the output terminal satisfies a threshold value with respect to the first time interval, and
   adjust, during a second time interval following the first time interval, a voltage of the output terminal in a step-wise manner based on the ratio,
   wherein the capacitor is charged or discharged based on the adjusted voltage.

2. The electronic device of claim 1, wherein the processor is configured to identify that the electronic device satisfies the specified condition based on the electronic device performing a voice call in a specified frequency band.

3. The electronic device of claim 2, further comprising:
a receiver,
wherein the processor is configured to identify that the electronic device satisfies the specified condition based on the receiver being activated responsive to the electronic device performing the voice call in the specified frequency band.

4. The electronic device of claim 2, further comprising:
a proximity sensor,
wherein the processor is configured to identify that the electronic device satisfies the specified condition based on the proximity sensor detecting an external object responsive to the electronic device performing the voice call in the specified frequency band.

5. The electronic device of claim 2, wherein the voice call comprises a voice call based on at least one of voice over LTE (VoLTE), voice over NR (VoNR), global system for mobile communications (GSM), or wideband code division multiple access (WCDMA).

6. The electronic device of claim 1, wherein the regulator comprises at least one of a boost converter or a buck converter.

7. The electronic device of claim 1, wherein the wireless communication circuit includes a power amplifier (PA), and wherein the PMIC is electrically connected to the PA.

8. The electronic device of claim 7, wherein the processor is configured to acquire a magnitude of an average power of an envelope signal or a wireless signal based on a peak value of an output of the PA responsive to transmitting the wireless signal.

9. The electronic device of claim 7, wherein the PA is included in a transmission path of the wireless communication circuit.

10. The electronic device of claim 1, wherein the threshold value is satisfied responsive to the change in the magnitude of the voltage of the output terminal being greater than or equal to the threshold value.

11. The electronic device of claim 1, wherein adjusting the magnitude of the voltage of the output terminal comprises boosting the magnitude of the voltage of the output terminal.

12. The electronic device of claim 1, wherein adjusting the magnitude of the voltage of the output terminal comprises bucking the magnitude of the voltage of the output terminal.

13. A method for operating an electronic device comprising:
identifying a change in a magnitude of a voltage of an output terminal of a regulator included in a power management integrated circuit (PMIC) for a first time interval responsive to the electronic device satisfying a specified condition;
identifying a ratio of a third time interval during which the change in the magnitude of the voltage of the output terminal satisfies a threshold value with respect to the first time interval, and
adjusting, during a second time interval following the first time interval, a voltage of the output terminal in a step-wise manner based on the ratio,
wherein a capacitor electrically connected to the output terminal is charged or discharged based on the adjusted voltage.

14. The method of claim 13, further comprising:
identifying that the electronic device satisfies the specified condition based on the electronic device performing a voice call in a specified frequency band.

15. The method of claim 14, further comprising:
identifying that the electronic device satisfies the specified condition based on a receiver being activated responsive to the electronic device performing the voice call in the specified frequency band.

16. The method of claim 13, wherein the threshold value is satisfied responsive to the change in the magnitude of the voltage of the output terminal being greater than or equal to the threshold value.

17. The method of claim 13, wherein adjusting the magnitude of the voltage of the output terminal comprises boosting the magnitude of the voltage of the output terminal.

18. The method of claim 13, wherein adjusting the magnitude of the voltage of the output terminal comprises bucking the magnitude of the voltage of the output terminal.

19. The method of claim 13, wherein adjusting the magnitude of the voltage of the output terminal in a step-wise manner comprises determining a number of warm stages based on a difference between a current output voltage and a target voltage, wherein the magnitude of the voltage is adjusted based at least in part on the number of warm stages.

* * * * *